Aug. 3, 1937. A. PETROFF 2,089,134
APPARATUS FOR INDICATING OR RECORDING THE RATE OF FLOW OF FLUIDS
Filed June 2, 1934 5 Sheets-Sheet 1
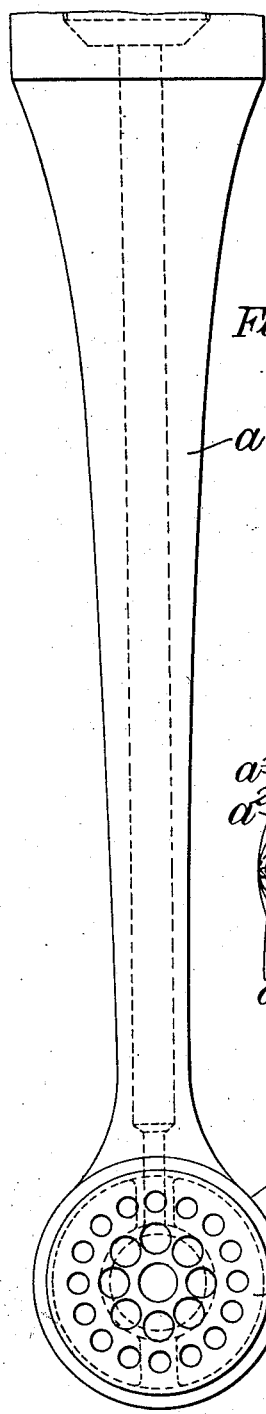
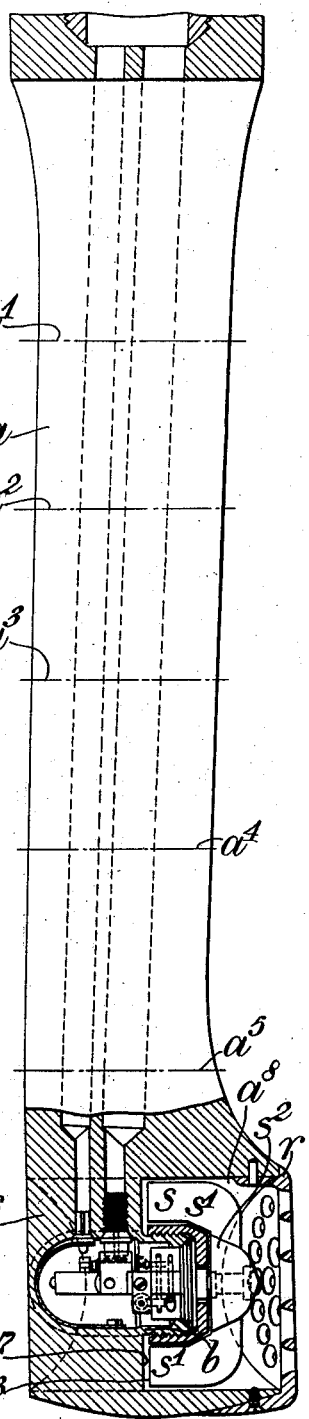
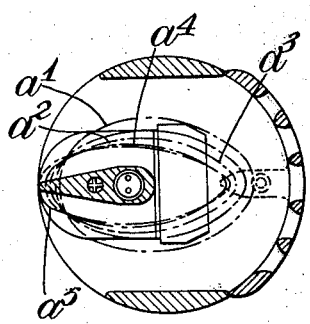
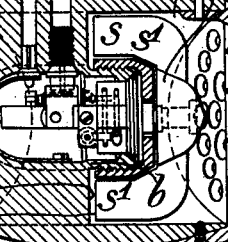

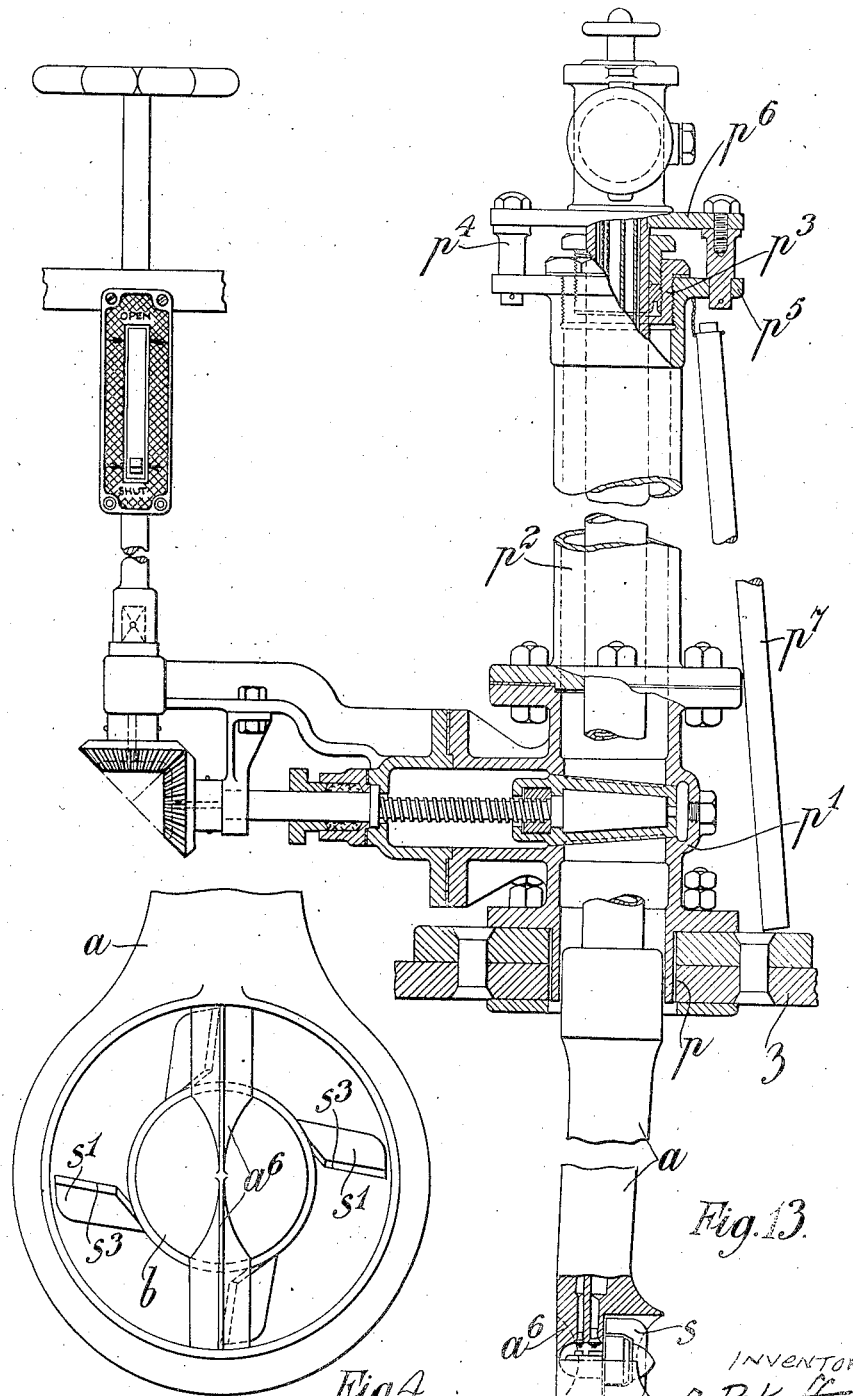

Aug. 3, 1937.  A. PETROFF  2,089,134
APPARATUS FOR INDICATING OR RECORDING THE RATE OF FLOW OF FLUIDS
Filed June 2, 1934   5 Sheets-Sheet 3

INVENTOR:
A. Petroff
By Marks & Clerk

Aug. 3, 1937.  A. PETROFF  2,089,134
APPARATUS FOR INDICATING OR RECORDING THE RATE OF FLOW OF FLUIDS
Filed June 2, 1934   5 Sheets-Sheet 4

INVENTOR:
A. Petroff
By: Marks & Clerk
Attys.

Aug. 3, 1937.   A. PETROFF   2,089,134
APPARATUS FOR INDICATING OR RECORDING THE RATE OF FLOW OF FLUIDS
Filed June 2, 1934   5 Sheets-Sheet 5
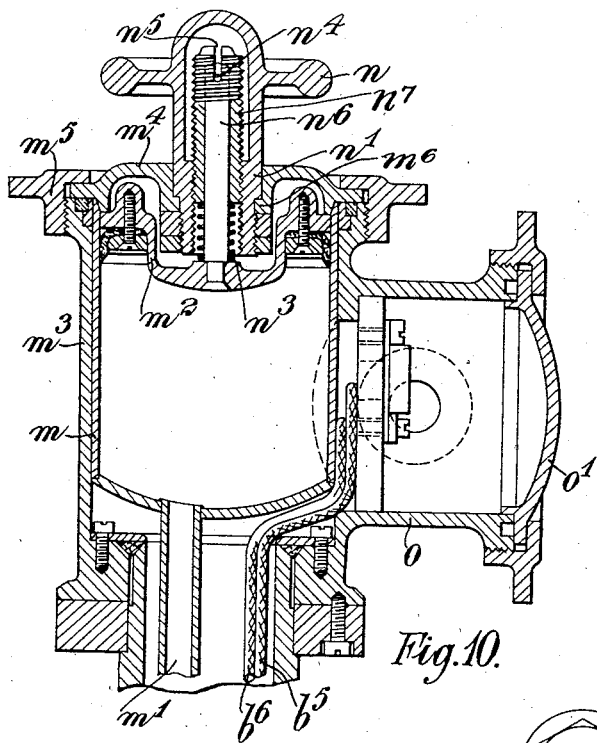
Fig. 10.
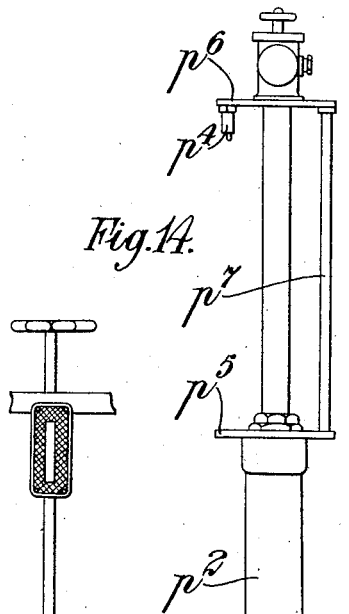
Fig. 14.
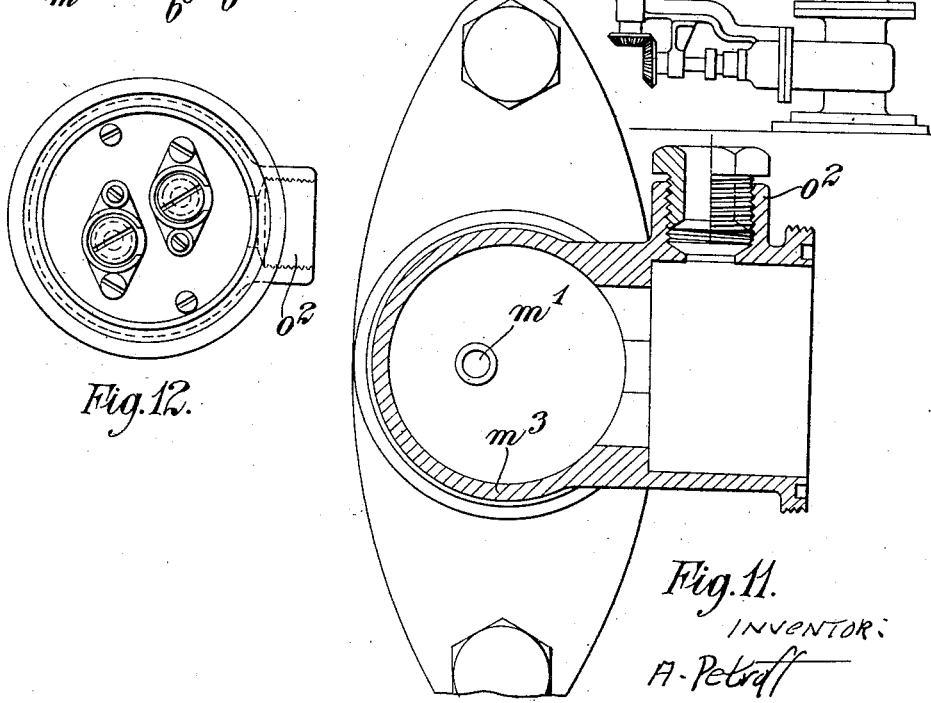
Fig. 12.
Fig. 11.
INVENTOR:
A. Petroff
By: Marks & Clark
Attys.

Patented Aug. 3, 1937

2,089,134

UNITED STATES PATENT OFFICE 2,089,134

APPARATUS FOR INDICATING OR RECORDING THE RATE OF FLOW OF FLUIDS

Alexander Petroff, West Kensington, London, England

Application June 2, 1934, Serial No. 728,733
In Great Britain June 8, 1933

4 Claims. (Cl. 73—229)

This invention relates to apparatus for electrically indicating and/or recording rate of flow of water or other fluid in relation to a fixed object or vice versa, as for instance the indicating and recording of ships' speeds and mileages, or the speed of running water.

Apparatus for such purposes as already available have utilized an impeller or screw driven by the water or the like; but an important disadvantage attaching to such devices has been that the slip which is inevitable in the use of a screw associated with driven parts of considerable mass or offering considerable load and which is variable at different speeds has been sufficient to introduce variable errors of a magnitude inhibitive to obtaining accurate reading at all speeds or even over moderate speed ranges. Such disadvantage can be overcome if the load or resistance to the rotation of the impeller or screw means is substantially restricted to the light intermittent engagement of elements of an electric make-and-break device and if the gear for operating said device is such as possesses practically negligible friction. The screw may thus operate the make-and-break device through gear including preferably a cam co-operating with a contact piece and driven at a suitable ratio through a worm or other gear, such device and gear being compactly contained in a preferably streamlined housing supporting and submergible with the screw. However, in existing apparatus submerged parts thereof have been such as are accompanied by lubrication difficulties and/or short circuiting of electrical contacts or the like due to access of water to the interior of such mechanism. Such defects necessitate putting the apparatus out of action as soon as inaccurate action is detected and for considerable periods of time while the mechanism is correctly lubricated and/or cleaned. Such procedure is objectionable in all cases and particularly is it so in marine work. In such cases, for instance, it is impossible to ascertain when the apparatus commences to become unreliable, as in the first place the navigating officer cannot in practice pay constant and unceasing attention to the apparatus; and secondly, water entering into the submerged parts of the apparatus does not short-circuit the make-and-break mechanisms instantaneously and permanently but causes them first to miss step and act generally in an irregular fashion before becoming definitely inoperative. For such reasons all the previous records of distances run are unreliable and thus the apparatus to a great degree loses its usefulness.

The object of the present invention is, broadly, to overcome such disadvantages as the foregoing, and more particularly to provide screw operated apparatus of the kind referred to, which will be reliable and accurate in operation while of simple construction.

The invention consists in apparatus for indicating or recording ships' speeds and mileages and for like purposes, comprising electric make-and-break operating devices of light construction compactly associated with a screw impeller or like rotator and contained in a suitable streamlined housing supporting and submergible with the latter and means for the continuous automatic passage of lubrication through said housing from an external source.

The invention also consists in apparatus for indicating or recording ships' speeds and mileages and for like purposes comprising electric make-and-break operating devices of light construction compactly associated with a screw impeller or like rotator and contained in a suitable streamlined housing arranged in alignment with the rotator on an axis directly in the line of relative movement in the fluid and a lubrication system connecting the interior of said housing with a forced lubricant supply positioned within the vessel or otherwise unsubmerged.

The invention further consists in apparatus according to either of the preceding paragraphs, in which the lubrication is effected more or less by induction to the housing under vacuum-creating action of the screw or the like and/or movement of water past the screw.

The invention further consists in apparatus comprising lubrication according to the preceding paragraph wherein the said vacuum-creating action produces a flow or creep of lubricant through the gland of the shaft, with automatic ejection or eduction of lubricant which may be emulsified by association with the water.

The invention further consists in apparatus according to any of the four preceding paragraphs in which the lubrication supply includes a non-return valve or the like.

The invention further consists in apparatus according to the preceding paragraphs having the supply of lubricant to the submergible housing maintained under pressure by means in a non-submerged supply chamber, such for instance as a resiliently loaded piston for the purpose set forth.

The invention further consists in a device as indicated comprising an arm or other holder supporting at one end the impeller or screw and its associated submergible housing and at the other an external lubrication supply chamber, and a lubricant conduit connecting said chambers contained within said holder with electric leads for the make-and-break device.

The invention also consists in speed and/or mileage indicating or recording apparatus substantially as hereinafter described with reference to the accompanying drawings.

Referring now to the accompanying drawings:—

Figure 1 is a side elevation partly in section of the submergible parts of one convenient construction of apparatus according to the invention.

Figure 2 is a front elevation corresponding to Figure 1.

Figure 3 is a cross sectional plan of the device shown in Figures 1 and 2.

Figure 4 is a rear elevation corresponding to the lower part of Figures 1 and 2.

Figure 10 is a vertical section on an enlarged scale of a lubricating system associated with the upper parts of the device shown in Figures 1 and 2.

Figures 11 and 12 are respectively transverse sections of the main body of the lubricator shown in Figure 10, and of a side branch of said lubricator.

Figure 13 is a part sectional elevation of a complete practical embodiment of the apparatus shown in the previous figures as fitted on the inside of a ship's hull.

Figure 14 being a smaller scale outside elevation of the complete apparatus.

In carrying the invention into effect in the convenient form shown, by way of example, as applied to ships' log purposes, the apparatus includes as shown in Figures 1 to 4 a bronze or other metal supporting arm or member $a$ of more or less elongated form having the greater portion of its length of streamline section illustrated by the contours $a_1$ to $a_5$ inclusive on Figures 1 and 3 which arm can be positioned to extend through a ship's hull at any suitable submerged region thereof. At the extremity of the submergible portion where the screw and associated make-and-break parts are associated the metal is shaped to provide an extension $a_6$ also of streamline section and set as shown eccentric in relation to the main body $a$. Metal is also formed into a hollow open-ended cylinder $a_6$ arranged to one side of the streamlined extension $a_6$ with its axis in the plane of the latter and normal to forward edge $a_7$ thereof.

The construction of the submerged end of the support described provides by the hollow cylindrical part $a_6$ a shroud within which the screw or impeller $s$ is rotatable. The supporting shaft of the screw is coaxial with the shroud and the latter acts to straighten the stream of water so that it always meets the screw and passes through its blades fairly. The make-and-break gear, contacts and associated parts are housed as shown most clearly in Figures 5 to 7 in an elongated streamline shaped chamber $b$ having a larger diameter and situated at about the middle of the length of the shroud $a_6$ and running back with gradually reducing diameter or as shown with a rounded end to meet and penetrate the extension $a_6$ referred to by which it is suitably supported, and with which it is preferably integral. With the screw $s$ in operative position its vanes or blades $s_1$ extend backwards within the shroud $a_6$ from a suitably nosed boss $s_2$ to embrace with suitable clearance the forward portion of the chamber $b$ and closure means for the latter to be described hereinafter; the trailing edges $s_3$ of the blades coming close to the said forward edge $a_7$ of the extension supporting said chamber.

With a perforated cover or grating $r$ preferably fixed over or fitted into the open end of the shroud and secured by bayonet or screw connections so as to prevent ingress of seaweed or other obstructing matter, the flow of water against the blades of the screw (when the construction is moved with the shroud meeting the water first) will be made coaxial with the screw, the discharge taking place from the blades over the trailing end of the chamber and bifurcated by the streamline extension $a_6$ supporting the latter.

Figure 5:
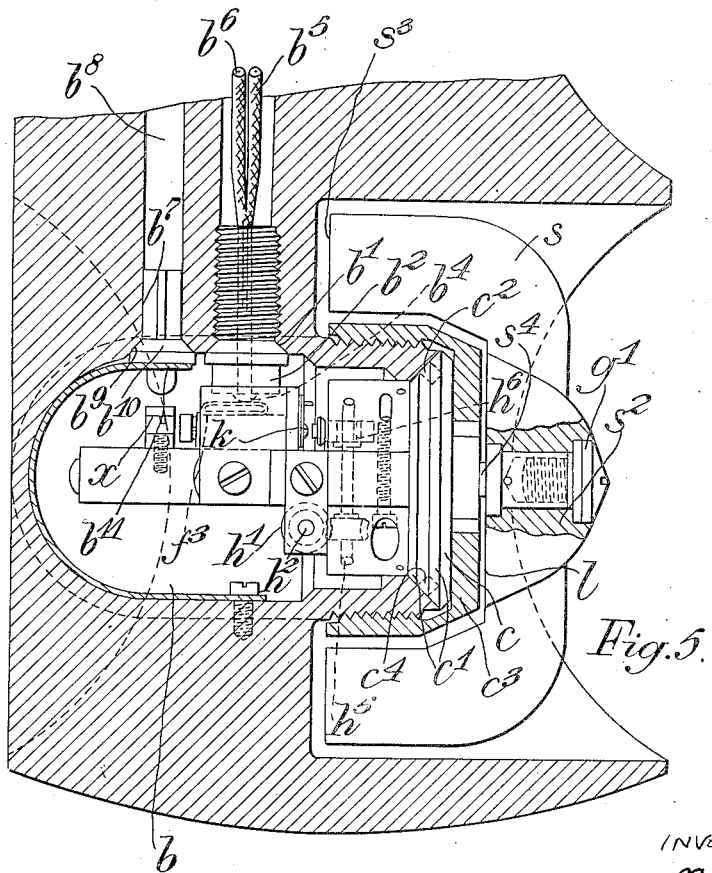
Figure 5 is an enlarged section corresponding to the lower part of Figure 1 and showing the rotator or operating mechanism with associated submerged parts.
Figure 6:
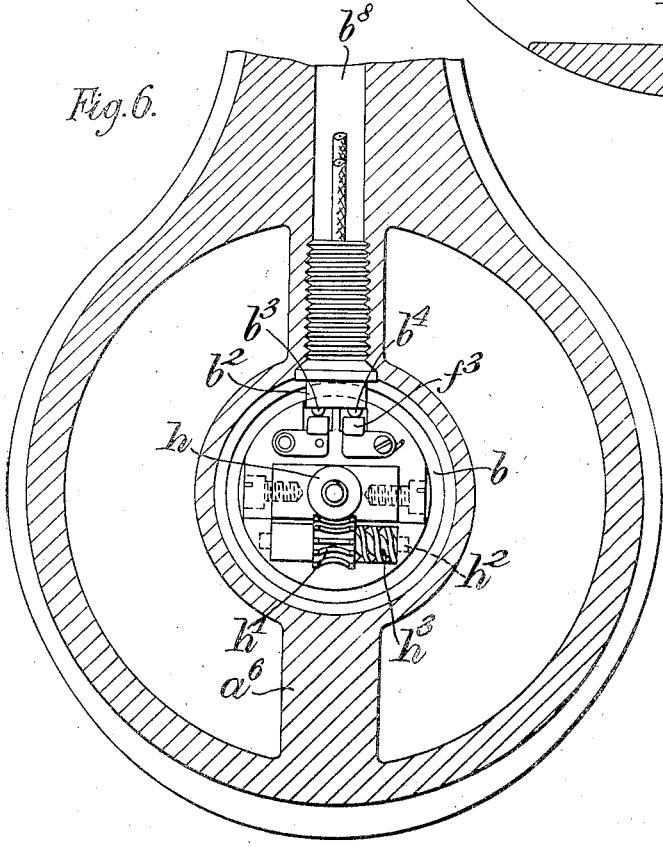
Figure 6 is a transverse section of the structure shown in Figure 5.

Referring particularly to Figures 5 and 6, the upper wall of the chamber $b$ is perforated at two regions within the supporting extension $a_6$ and into one $b_1$ of the holes so formed is screwed an insulating bushing $b_2$ carrying mutually insulated contact points $b_3$, $b_4$, the ends of which are exposed to the inside of the chamber. These contacts are also connected to leads $b_5$, $b_6$, running through the bushing and up the inside of the support for connection with suitable indicator or recording apparatus of any kind. The second hole $b_7$ is connected to a lubricating duct $b_8$ also running up the interior of the support $a$ to a lubricating chamber, as to be hereinafter described, and further the hole is shaped to provide a seating $b_9$ for accommodating a non-return valve $b_{10}$ adapted conveniently to be held upwardly against said seating as by a spring finger or C-spring $b_{11}$ anchored on the inside of the chamber.

The impeller shaft $s_4$ passes through a circular cover or closure disc $c$ comprising as shown a conical peripheral zone $c_1$ interrupted by a concentric groove $c_2$ containing a rubber or other packing ring, such disc being adapted to be held by a screwed flange ring or cap $c_3$ to provide a water-tight closure between the coned surfaces at $c_1$ and a complementary coned mouth $c_4$ at the forward end of the chamber. These shaft and cover parts described are united with antifriction bearings for the shaft, make-and-break mechanism and suitable reduction gear so that the whole forms a unit which can be assembled as shown in Figure 8 and attached, preferably after charging the chamber with lubricant, in correct position in the chamber and so as at once to complete the electric circuits by the simple operation of affixing the circular cover as described above.

Figure 8:
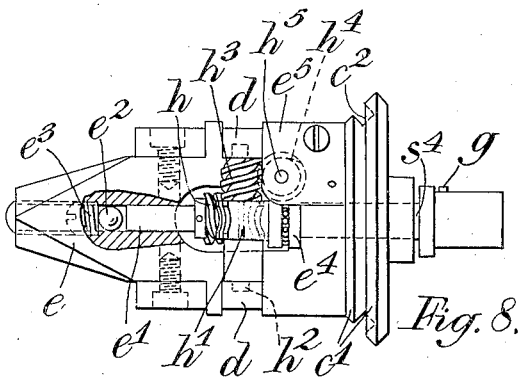
Figure 8 is an enlarged underside view of the internal mechanism shown in Figures 5 and 6.
Figure 7:
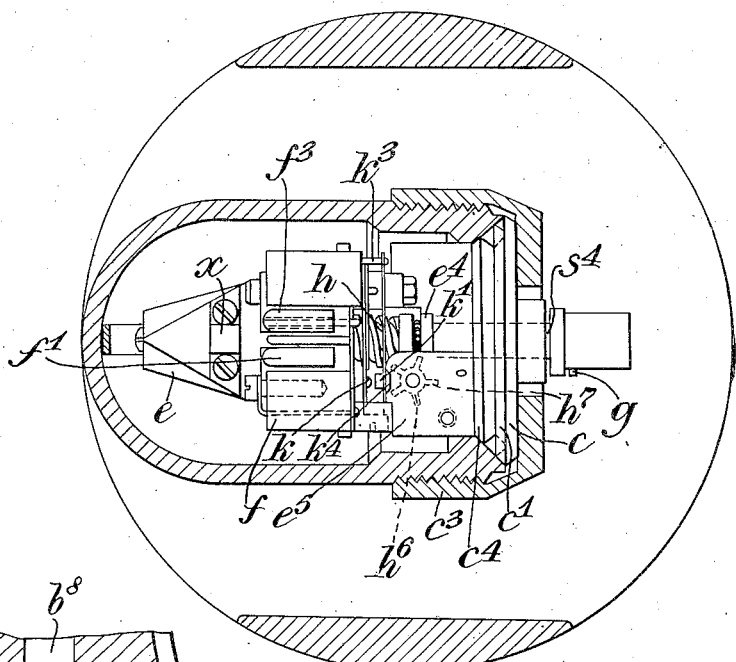
Figure 7 is an enlarged sectional plan of the structure shown in Figures 5 and 6.

Continuing to describe the mechanism which comprises the unit and referring particularly to Figures 5 and 8 the cover $c$ comprises on its inside a pair of parallel arms or brackets $d$ extending one on each side of the impeller shaft $s_4$ and affording by bridging pieces at its ends and elsewhere ball bearing journals for said shaft and a means for mounting the make-and-break mechanism. Thus, a block $e$ secured between the extremities of said arms $d$ as shown in Figures 7 and 8 provides a journal bearing at $e_1$ for the end region of the shaft $s_4$ and also an end thrust bearing conveniently comprising a ball $e_2$ retained by screw means $e_3$ preferably also affording positional and end-play adjustment for the shaft.

A ball thrust bearing $e_4$ is also provided between an intermediate portion of the shaft and a built up bearing block structure $e_5$ attached to the cover or disc $c$, while a second journal or gland bearing of simple form and ordinary proportions is provided within the latter. Over the said block $e$, there is also supported the terminal block $f$ of suitable insulating material, in pockets $f_1$ of which the leaf spring or like contacts $f_3$ are suitably mounted in positions such that when the unit is in position said contacts engage electrically with the contacts $b_3$ and $b_4$ respectively, as shown in Figures 5 and 6. The block conveniently also supports stop means $x$ lying opposite to the valve $b_{10}$ for limiting its lift.

The impeller shaft, to which the impeller is secured by peg $g$ and retaining screw means $g_1$ after the unit has been inserted in the chamber $b$ and the latter has been sealed by screwing on the element $c_3$, carries for instance a worm $h$ which as shown in Figures 5 to 8 meshes with a worm wheel $h_1$ mounted on a transverse spindle $h_2$, the latter driving through a second worm and worm wheel train $h_3$ and $h_4$ and vertical spindle $h_5$ a suitably shaped cam or star wheel $h_6$ of insulating material the projecting elements or teeth $h_7$ of which are adapted in rotation of the spindle $h_5$ to close temporarily contacts $k$, $k_1$ mounted upon a lateral face of said insulating block $f$. Of the said contacts $k$ is fixed to the block $f$ while $k_1$ comprises a leaf spring supported from said block by a pillar $k_3$, so as to be deflected by the cam wheel to perform the required make-and-break action with the contact $k$. These contacts are respectively connected with the already described leaf or spring elements or terminals $f_1$ and $f_3$ by leads passing through the insulating block whereby to complete the circuit containing the contact points in the wall of the chamber. By the foregoing provisions an indication may be made electrically with a frequency strictly proportional to the speed of rotation of the screw or impeller, and depending upon the gear ratio adopted and the number of projections on the cam.

Figure 9:
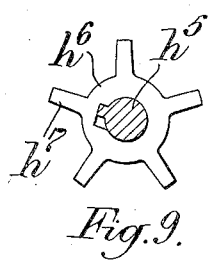
Figure 9 is an enlarged view of a cam wheel.

Provision is readily made for a quick break of the cam actuated contacts $k$, $k_1$ to occur for the avoidance of sparking and fouling of the contacts which may occur when the best oil for the purpose, e. g. transformer oil, is used as insulative lubricant. Thus, the cam wheel shown enlarged in Figure 9, or any other element in the gear trains described, may be provided with an enlarged key way or like lost motion connection to its respective spindle permitting positive rotation of the cam by the worm into the position when the contacts $k$, $k_1$ are closed, the cam wheel thereupon being free to advance or jump, as under resilient reaction of the leaf spring of the contact $k_1$, ahead of the shaft or shaft train and allow the contacts to break sharply. A stud or the like $k_4$ provided for engagement with the cam wheel teeth may be provided with sloping or other surfaces enabling the contact to react upon the cam teeth in the desired manner.

It will be understood that the driven parts are restricted to the impeller, its shaft, and a gear which may be of the lightest construction offering negligible frictional resistance, and also that the effort required of such gear in closing the leaf spring contacts is very slight, so that slip of the impeller will not be sufficient to introduce troublesome inaccuracies in the readings obtained from instrument at different speeds.

The running or gland clearance between the shaft $s_4$ and its journal in the chamber cover $c$ is cut down to a minimum, of the order of a fraction of one thousandth of an inch, to minimize leakage of water into or unnecessary waste of lubricant out of the chamber while avoiding need for any packing increasing friction. The shaft is also so positioned by the thrust bearings $e_2$, $e_4$ that there is a small end or annular clearance space $l$ between the impeller boss $s_2$ and the outer face of the cover element $c_3$ within which space the impeller in running and the flow of water past the propeller boss cooperate to create a partial vacuum inhibitive to ingress of water to the chamber $b$, and also promoting an automatic induction of lubricant through the non-return lubricating valve $b_{10}$ into the chamber and extraction, eduction or creeping of lubricant through the gland, ensuring against inefficient lubrication of the parts due, e. g., to emulsification. These provisions, it will be understood, also afford a means of automatically rectifying lubrication after the device has been submerged for a time without rotation of the impeller and more or less water may have crept into the chamber or gland to vitiate the lubricant therein. The non-return action of the lubricator valve, however, assuming the chamber $b$ to be charged with lubricant, enables sufficient pressure of lubricant to be held within the chamber interior to prevent actual entry of water under static pressure.

Referring now to the preferred construction of lubricating device which is attached to the upper end of the support $a$, the former comprises as shown in Figures 10 to 12 a cylindrical chamber $m$ to which the upper end of the lubricating duct $b_8$ is connected by a pipe $m_1$, and a piston or plunger $m_2$ movable by a hand-operated screw from outside of a removable top cover.

In the construction shown most clearly in Figure 10 the chamber or cylinder $m$ is housed in (as a liner to) a body portion or casing $m_3$ which is in turn attached at one end of a tubular extension $q$ of any length which connects also by screw or otherwise with the support $a$ and in which the electric leads and said pipe $m_1$ are accommodated. A detachable cover $m_4$ held on the casing by a screwed flange ring $m_5$ and sealed by a rubber or other gasket serves as a closure for the cylinder $m$ and also retains the latter by end pressure. The cover also supports in a journal at $m_6$ a form of telescopic screw, the construction which is clearly shown and comprises the internally screwed boss $n_1$ of the handwheel $n$, within which is provided a complementarily externally screwed sleeve $n_7$. Rotation of the boss $n_1$ by the hand-wheel $n$, causes the sleeve $n_7$ to be ejected or retracted in relation to the hand-wheel; the sleeve being prevented from rotating by engagement of the transverse slot $n_5$ with the transverse stop pin $n_4$ passing through the end of the spindle $n_6$, this last being carried by the piston $m_2$ and being a sliding fit inside the sleeve $n_7$. According to the direction of rotation of the hand-wheel said sleeve is caused to thrust upon the piston $m_2$ through a buffer spring $n_3$. Compression of the spring produced thus by rotation of the hand-wheel is gradually dissipated as downward motion of the piston takes place and the lubricant is forced out of the cylinder $m$. While the charge of lubricant lasts the pressure of lubricant requisite for excluding the water from the chamber $b$ can be maintained by a periodic or occasional screwing up of the hand-wheel. If desired I may make the spring $n_3$ and sleeve $n_7$ of sufficient lengths to enable say the whole of the reservoir contents to be exhausted progressively by a single preliminary screwing up of the hand-wheel. Separational displacement of the piston and the sleeve nut is limited by the stop pin $n_4$ meeting the bottom of the slot $n_5$, so that filling of the chamber $m$ is done while the piston and cover parts are detached together.

With lubricant charged into the upper chamber $m$, the submerged or smaller chamber can thus be charged at pressure, e. g. against static water pressure, through the lubricating pipe $m_1$ and duct $b_8$ and maintained at a sufficiently high pressure to produce a positive flow of lubricant, by periodic manipulation of the hand-wheel as described above.

Conveniently also, the lubricating chamber (see Figures 10 to 12) forms a support for a terminal box $o$ to which the leads from the make-and-break device are brought up the tubular casing as shown. The terminal box which is constructed preferably as shown and embodies an access cover $o_1$ of the same design as the lubricant chamber cover, and a glanded lead branch $o_2$, enables the connection to be made to any form of electrically-actuated indicator or recording apparatus situated in the chart house or elsewhere on board the ship.

The whole apparatus as described above in relation to the ship's hull is shown in Figures 13 and 14. Thus the device may be set in operative position by provision of an opening $p$ through the hull $z$ at any suitable submerged point thereof, such opening being provided with a sluice or other valve $p_1$ on the inside and a flanged extension pipe $p_2$. When it is desired to use the apparatus the tubular support $a$ and its connected extension $q$ are passed into said pipe $p_2$ and, a telescopic gland connection of suitable construction being provided at $p_3$ to effect a water-tight joint around the apparatus, the sluice valve $p_1$ can be opened and the apparatus pushed or lowered in further until the impeller and small chamber are set out from the hull as shown in Figure 13 at the required position, such position being conveniently determined by engagement of distance pins $p_4$ between the upper flange $p_5$ of the extension pipe $p_2$ and a flange $p_6$ on the base of the lubricant supply cylinder structure. The drawings referred to show the device respectively in operative and inoperative positions in relation to a suitable sluice valve with indicator means, and it will be seen that the device can readily be held up in withdrawn position by a distance rod $p_7$ insertable as shown between the two flanges $p_5$ and $p_6$.

It is understood that the apparatus may be used with either the smaller chamber or the impeller first meeting the flow of water, e. g. with the ship moving astern or ahead, the cylindrical shroud for the impeller being equally effective as a stream straightener in either direction of use and during manoeuvring of the vessel, and the extension of the support carrying the small chamber acting as a sufficient guard for the impeller during reverse running.

It is also to be understood that modifications and additions may be introduced without departing from the scope of this invention as indicated in the foregoing statements, the specific description of apparatus for marine work being given by way of example only.

Having now described my invention, what I claim as new and desire to secure by Letters Patent is:—

1. The combination with means for remotely controlling electric indicating and recording apparatus and comprising a unit submergible in water, consisting of a rotator, an electric interrupter driven by said rotator, a housing enclosing said interrupter and a spindle connecting said interrupter and said rotator, said spindle entering said housing through a substantially frictionless unpacked gland, of a remotely situated lubricant supply reservoir, a liquid connection from the latter to the said housing and non-return valve means in said connection in immediate proximity to said housing and operating inwardly of said housing and resilient resistant means acting against opening of said valve means.

2. The combination with means for remotely controlling electric indicating and recording apparatus and comprising a unit submergible in water, consisting of a rotator, an electric interrupter driven by said rotator, a housing enclosing said interrupter and a spindle connecting said interrupter and said rotator, said spindle entering said housing through a substantially frictionless unpacked gland, of a liquid reservoir remotely situated from said unit and provided with pressure applying means, a liquid connection between said reservoir and said unit, a non-return valve in said connection in proximity to said housing and operating inwardly of said housing and resilient resistant means tending to hold said valve closed.

3. Apparatus comprising a submergible unit consisting of an electric interrupter, a rotator, a spindle carrying said rotator and forming a drive to said interrupter, a housing enclosing said interrupter, and an unpacked gland admitting the spindle of said rotator, means for supporting said unit and conveying thereto electric leads from a remotely situated electric apparatus to be controlled by said interrupter, a remotely situated lubricant reservoir of a substantial capacity, a liquid connection from said reservoir extending through said supporting means and opening into said housing, a resiliently loaded valve in the junction of said connection with said housing and openable inwardly of said housing, and resiliently loaded means in said reservoir for subjecting the contents thereof to an elevated pressure in excess of water pressure acting on the exterior of said gland when said unit is submerged.

4. Apparatus according to claim 3, having the housing, connection and reservoir filled with a wholly inelastic insulative liquid and devoid of air bodies.

ALEXANDER PETROFF.